US012619472B2

(12) United States Patent
Hintermeister et al.

(10) Patent No.: US 12,619,472 B2
(45) Date of Patent: May 5, 2026

(54) OVERFLOW OF ON-PREMISES HOST WORKLOADS ONTO SECURE CLOUD

(71) Applicant: International Business Machines Corporation, Armonk, NY (US)

(72) Inventors: Gregory R. Hintermeister, Rochester, MN (US); Truman Brown, Bellevue, WA (US); Jeremy Sheridan Caine, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 427 days.

(21) Appl. No.: 18/212,004

(22) Filed: Jun. 20, 2023

(65) Prior Publication Data

US 2024/0427640 A1 Dec. 26, 2024

(51) Int. Cl.
*G06F 9/50* (2006.01)

(52) U.S. Cl.
CPC .......... *G06F 9/5072* (2013.01); *G06F 9/5077* (2013.01)

(58) Field of Classification Search
CPC .... G06F 9/5072; G06F 9/5077; G06F 9/5083; H04L 67/10
See application file for complete search history.

(56) References Cited

U.S. PATENT DOCUMENTS

| | | | |
|---|---|---|---|
| 8,572,612 B2 | 10/2013 | Kern | |
| 9,276,812 B1 * | 3/2016 | Nagargadde | ........ H04L 41/5054 |
| 9,590,879 B2 | 3/2017 | Wray | |
| 9,912,607 B2 | 3/2018 | Steinder et al. | |
| 11,005,733 B2 | 5/2021 | Savov et al. | |
| 11,025,627 B2 | 6/2021 | Li et al. | |
| 11,888,930 B1 * | 1/2024 | Ezrielev | .............. H04L 67/1008 |
| 2013/0013328 A1 | 1/2013 | Donovan et al. | |
| 2017/0063667 A1 * | 3/2017 | Maskalik | ............ H04L 43/0852 |
| 2018/0234459 A1 * | 8/2018 | Kung | ................... H04L 63/0263 |
| 2019/0065275 A1 * | 2/2019 | Wong | ..................... G06F 9/4843 |
| 2021/0126965 A1 | 4/2021 | Patil et al. | |
| 2021/0211393 A1 | 7/2021 | Jiang et al. | |
| 2023/0342176 A1 * | 10/2023 | Nair | ................... G06F 9/45545 |
| 2023/0412642 A1 * | 12/2023 | Arora | ..................... H04L 63/20 |

* cited by examiner

*Primary Examiner* — Sisley N Kim
(74) *Attorney, Agent, or Firm* — Garg Law Firm, PLLC; Rakesh Garg; James Olsen

(57) ABSTRACT

An embodiment provisions overflow from on-premises cloud workload onto a secure infrastructure provider. The embodiment senses a performance metric of an on-premises cloud. The embodiment deciding, responsive to the sensed performance metric, to scale up, senses a property of an infrastructure provider, responsive to the sensed property, selects the infrastructure provider. The embodiment generates credentials, creates a secure environment, establishes secure communications, and provisions compute hosts in the selected infrastructure provider.

20 Claims, 8 Drawing Sheets

400

| SENSE PROPERTIES OF ON PREMISE CLOUD 402 | SCALE UP TO INFRASTRUCTURE PROVIDER 404 | GENERATE CREDENTIALS 406 | PROVISION AN ENVIRONMENT ON INFRASTRUCTURE PROVIDER 408 | CONFIGURE NODES ON INFRASTRUCTURE PROVIDER AND EXECUTE WORKLOAD 410 |

SENSE PROPERTIES OF ON PREMISE CLOUD 502

SCALE DOWN 504

TERMINATE WORKLOAD ON INFRASTRUCTURE PROVIDER 506

DEPLOY WORKLOAD ON HOSTS IN ON-PREMISE CLOUD 508

EXIT ENVIRONMENT ON INFRASTRUCTURE PROVIDER 510

500

OVERFLOW OF ON-PREMISES HOST WORKLOADS ONTO SECURE CLOUD

BACKGROUND

The present invention relates generally to cloud computing. More particularly, the present invention relates to a method, system, and computer program for overflow of on-premises host workloads onto secure cloud.

Cloud computing technology has evolved significantly over the past few years. Distributed cloud is a public cloud computing service that lets users run public cloud services in multiple locations—the user's own data centers, other cloud providers' data centers, third-party data centers or colocation centers, and on-premises and manage from a control plane. Distributed cloud provides the ideal foundation for edge computing-running services and applications closer to where data is created. On-premises cloud enable the user to deploy, manage, and control the user's app workloads on a vendor distributed cloud provider's cloud running in the on-premises data center such as in scenarios where either internal policy or external regulatory mandate preclude use of a public cloud.

However, on-premises distributed cloud still uses on-premises infrastructure and based on workload and performance demands, it is difficult to provision new hosts in the on-premises location at the scale required by the workload due to the limitations of data center space and physical hardware.

SUMMARY

The illustrative embodiments provide for the overflow of on-premises cloud workloads onto a secure infrastructure provider. An embodiment includes sensing a performance metric of an on-premises cloud, deciding, responsive to sensing a performance metric of the on-premises cloud, to scale up. The embodiment also includes sensing a property of an infrastructure provider, responsive to the sensed property, selecting the infrastructure provider. The embodiment also includes generating a credential in the on-premises cloud for the selected infrastructure provider. The embodiment also includes creating a secure environment in the infrastructure provider using the credential. The embodiment also includes establishing secure communication between the on-premises cloud and the selected infrastructure provider. The embodiment includes provisioning a compute host in the selected infrastructure provider. The embodiment also includes the provisioning causing a secure extension of the on-premises cloud into the selected infrastructure provider, the secure extension appearing as a part of the on-premises cloud to a workload executing in the on-premises cloud. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
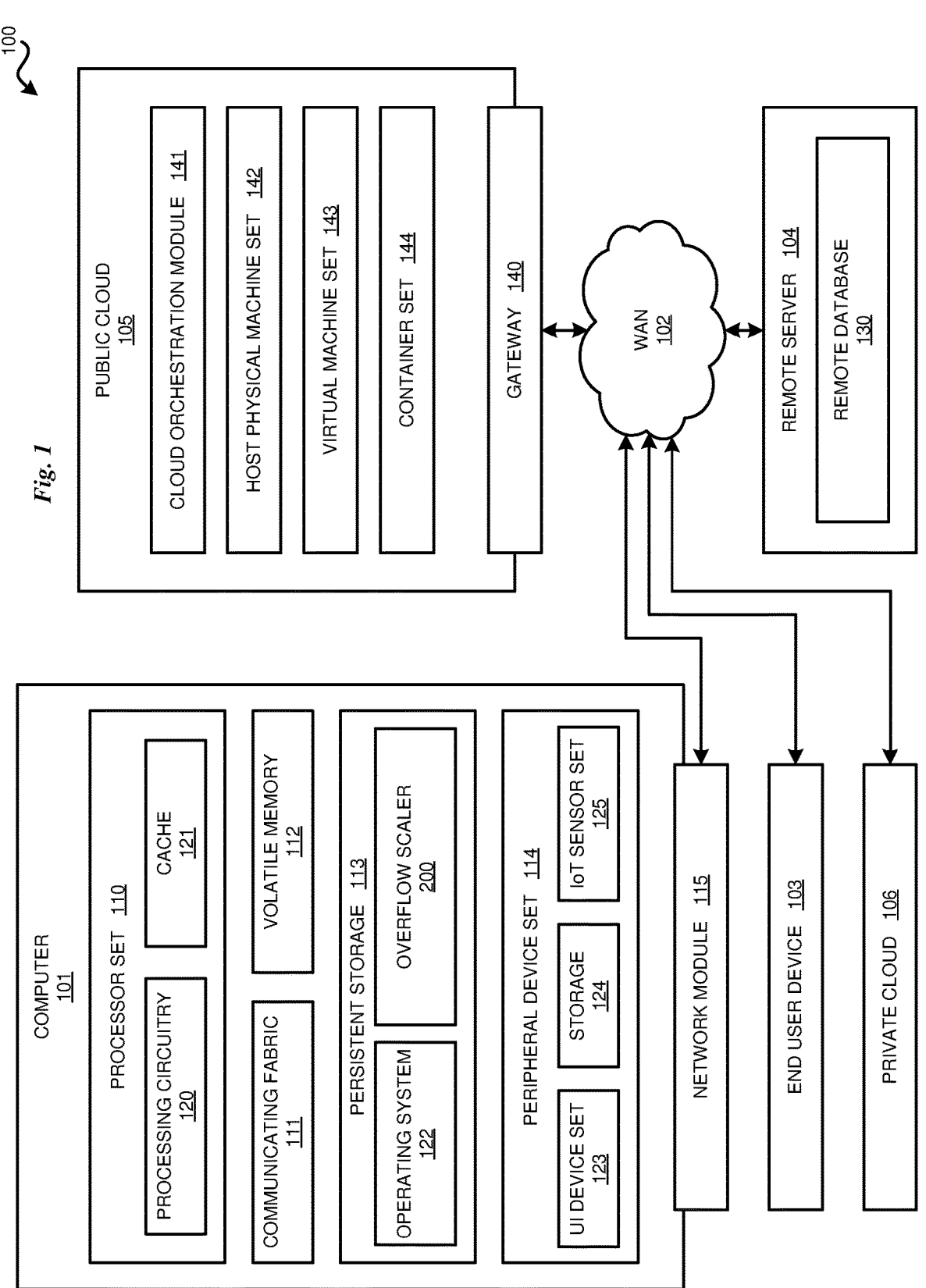
FIG. 1 depicts a block diagram of a computing environment in accordance with an illustrative embodiment.

Distributed cloud provides the ideal foundation for edge computing-running services and applications closer to where data is created. On-premises cloud enables the user to deploy, manage, and control the user's app workloads on a vendor distributed cloud provider's cloud running in the on-premises data center such as in scenarios where either internal policy or external regulatory mandate preclude use of a public cloud.

However, on-premises distributed cloud still uses on-premises infrastructure and based on workload and performance demands, it is difficult to provision new hosts in the on-premises location at the scale required by the workload due to the limitations of data center space and physical hardware.

Currently there is no way to dynamically create a secure overflow distributed cloud location in a nearby public infrastructure provider that has the security and requirements of the on-premise cloud. Contemporary efforts consider scaling workloads across multiple cloud environments only.

The present disclosure addresses the deficiencies described above by providing a method, a machine-readable medium, and a system that sense performance metrics of an on-premises cloud, responsive to the sensed performance metrics, compute whether to scale up or scale down, wherein deciding to scale up comprises; sensing properties of an infrastructure provider, responsive on the sensed properties, selecting the infrastructure provider; generating credentials in the on-premises cloud for the selected infrastructure provider; creating a secure environment in the infrastructure provider; establishing secure communication between the on-premises cloud and the selected infrastructure provider; and provisioning a compute host in the selected infrastructure provider.

The illustrative embodiments provide for overflow of on-premises cloud workloads onto a secure infrastructure provider. An overflow as referred to herein generally describes when a compute host no longer have the resources to run workloads, and the workloads are then deployed to another host. An overflow may also refer to when the resources of a compute host fall below a threshold, and another host is provisioned. On-premises cloud enable the user to deploy, manage, and control the user's app workloads on a vendor distributed cloud provider's cloud running in the user's data center; however, use of this example is not intended to be limiting, but is instead used for descriptive purposes only.

Illustrative embodiments include wherein the properties of the infrastructure provider comprise location, cost, performance metrics or vendor.

Illustrative embodiments include wherein the secure communication is isolated to connect only the on-premises cloud and the selected infrastructure provider.

Illustrative embodiments include wherein the secure environment in the infrastructure provider comprises establishing a virtual private cloud.

Illustrative embodiments include wherein the sensed performance metrics of the on-premises cloud comprises processor usage, memory usage, or storage usage of the plurality of compute hosts.

Illustrative embodiments include wherein further comprising sensing performance metrics of the selected infrastructure provider, computing whether to scale down wherein determining to scale down is based on at least completion of the workload, the performance metrics of the on-premises cloud and the performance metrics of the selected infrastructure provider.

Illustrative embodiments also include wherein deciding to scale down comprises:

transmitting host data over the secure connection; deprovisioning the compute hosts; and
  terminating the secure connection.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an Overflow Scaler module 200 that provides overflow of on-premises workloads onto secure cloud hosts in the nearby region. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
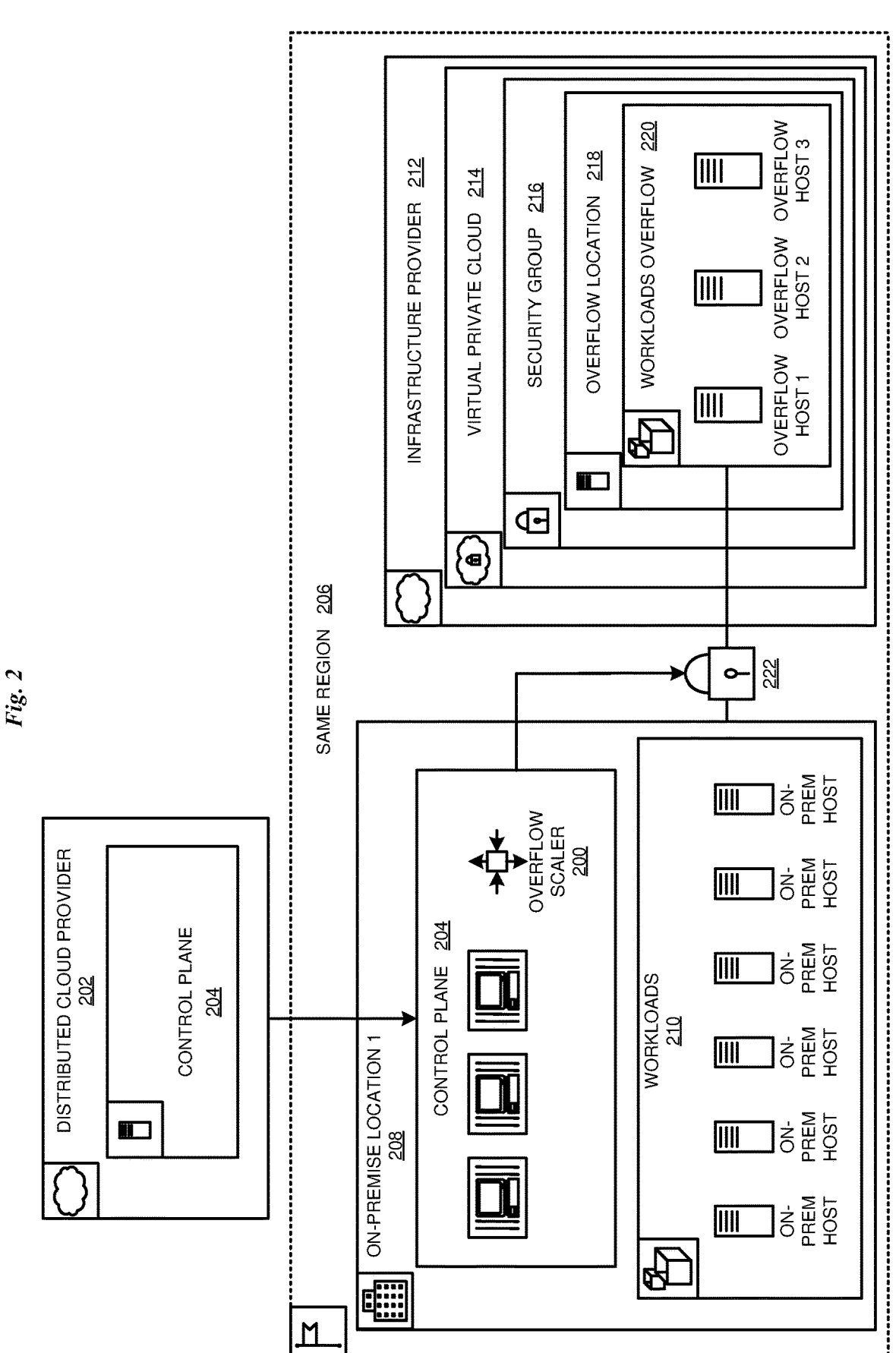
FIG. 2 depicts a block diagram of an on-premises distributed cloud in accordance with an illustrative embodiment.

With reference to FIG. 2, this figure depicts a block diagram of an on-premises distributed cloud in accordance with an illustrative embodiment. In the illustrated embodiment, the service infrastructure 208 includes the Overflow scaler module 200 of FIG. 1.

In the illustrated embodiment, the distributed cloud provider 202 provides services and service instances to an on-premises cloud location 208. The on-premises cloud location 208 comprises a control plane 204 and an Overflow Scaler module 200, and on-premises hosts executing workloads 210. The Overflow Scaler module 200 senses performance metrics, for example processor usage, memory usage, or storage usage of the compute hosts of the on-premises location, and computes whether to scale up or scale down as described herein, and a decision is made to overflow to an infrastructure provider 212 in the same geographical region 206, the on-premises cloud location communicates over a secure connection 222 to an overflow infrastructure provider 212. In some embodiments, the overflow infrastructure provider 212 may be secured by a virtual private cloud 214 and one or more security groups 216. The overflow location 218 is provisioned with compute hosts, storage and networking resources for execution of the overflow workloads 220.

The virtual private cloud 214 is secured in some example embodiments by network access controls comprising of access control lists that define a set of IP addresses or applications granted access within the virtual private cloud, and a plurality of security groups 216 that are groups of resources with assigned uniform access rules.

The distributed cloud provider 202 in some embodiments may comprise a provider of a public cloud computing service that lets clients run public cloud infrastructure in multiple locations—the client's data centers, other cloud providers' data centers, third-party data centers or colocation centers. In some cases, there may be situations where clients subscribing to cloud services may keep hardware or data on-site in an on-premises cloud location.

In some embodiments, the distributed cloud provider establishes the control plane for management of distributed cloud provider services in the on-premises cloud location. In embodiments, the on-premises control plane runs resources to manage the hosts, clusters, and other resources. The distributed cloud provider provides services to the on-premises cloud through the on-premises control plane.

As described herein, an infrastructure provider may include a cloud provider or edge network but is not limited to be the same as the distributed cloud provider. In some embodiments, the Overflow Scaler module 200 senses properties of the infrastructure provider, for example location, cost, performance metrics or vendor specific information. The on-premises cloud location 208 communicates with the overflow infrastructure provider 212 via a secure connection 222. In some embodiments that there is no connection or communication between the distributed cloud provider 202 and overflow infrastructure provider 212.

In some embodiments, compute hosts in the overflow infrastructure provider 212 may be managed by the on-premises control plane 204. In other words, the compute hosts in the overflow infrastructure provider become an extension of the on-premises compute hosts and may be grouped into one compute node cluster, where a computer node cluster is generally understood as a collection of connected hosts that are available for computing tasks of one or more workloads.

In some embodiments, the workloads themselves can also be stretched so that a whole or partial portion of the workload is moved to the overflow hosts thereby leaving room for the new workload on premises.

Figure 3:
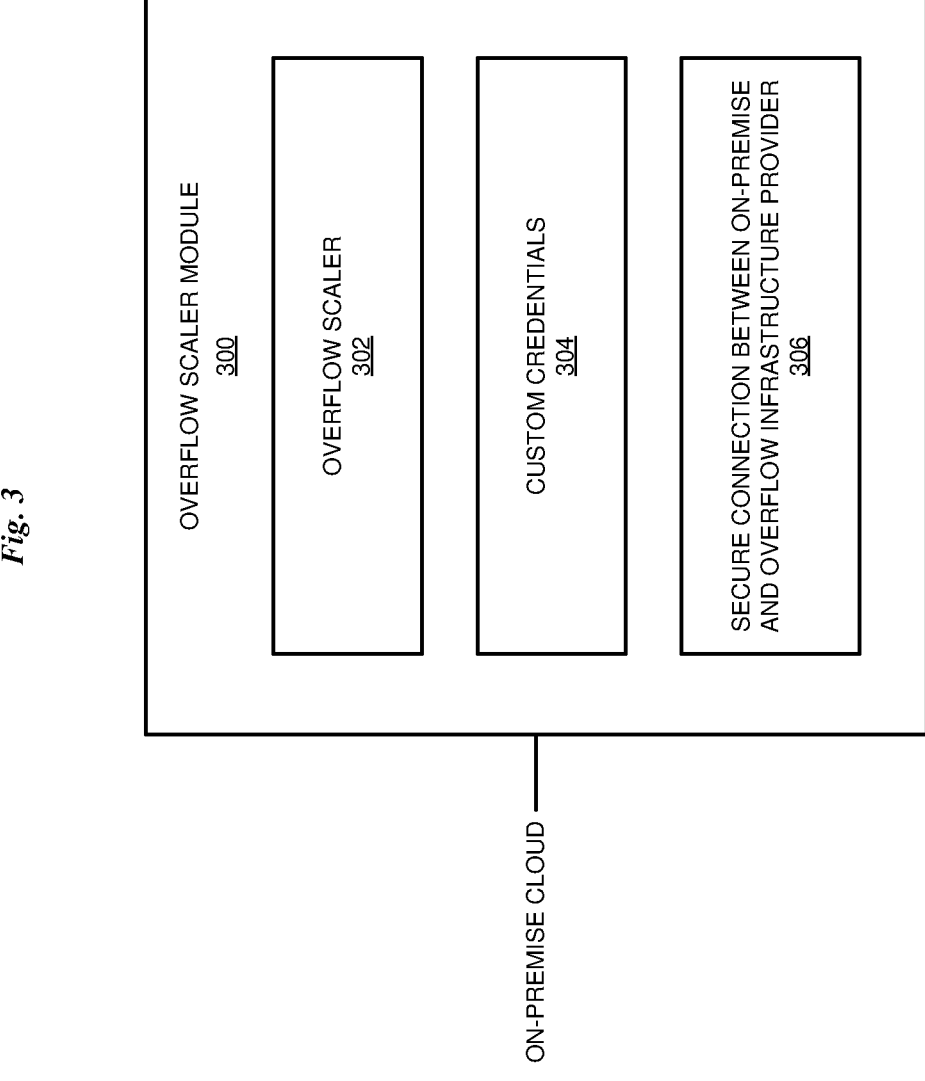
FIG. 3 this figure depicts a block diagram processing environment of an Overflow Scaler module in accordance with an illustrative embodiment.

With reference to FIG. 3, this figure depicts a block diagram processing environment of an Overflow Scaler module 200 in accordance with an illustrative embodiment. In the illustrated embodiment, the Overflow Scaler module 300 is an example of the Overflow Scaler module 200 of FIG. 2.

In the illustrated embodiment, the Overflow Scaler module 300 comprises the on-premises Overflow Scaler component 302, Custom credentials component 304, and Secure connection component 306 to connect between the on-premises location and overflow infrastructure provider. In some embodiments, the Overflow Scaler component 302 senses the resource limits of the on-premises hosts by monitoring performance metrics for example central processing unit usage, memory usage, storage, and temperature and further computing if the performance thresholds have been exceeded. If on-premises hosts, or nodes exceed the threshold, the Custom credentialing component 304 creates credentials for a selected infrastructure provider to overflow the workload, and the Overflow Scaler component 302 provisions a virtual private cloud, security group, and compute hosts in the overflow infrastructure provider.

In some embodiments, the Overflow Scaler provisions compute hosts through a process of setting up physical or virtual hardware; installing and configuring software, such as the operating system and applications; and connecting it to middleware, network, and storage components. Provisioning may encompass all of the operations needed to create a new machine and bring it to the desired state, which is defined according to business requirements. For example, provisioning tasks may also be handled through infrastructure-as-code (IaC). With IaC, infrastructure specifications are stored in configuration files, which are executed to provision the same environment every time.

In some embodiments, the provisioning of compute nodes causes a secure extension of the on-premises cloud into the selected infrastructure provider, the secure extension appearing as a part of the on-premises cloud to a workload executing in the on-premises cloud.

In an embodiment, the Overflow Scaler 302 may monitor the on-premises cloud and overflow infrastructure provider hosts, and can scale down the hosts if a lower threshold is reached or after the workload has completed on the overflow hosts. The Overflow Scaler module 300 may be deployed on-premises and may be an executable module in the control plane however, this is not intended to be limiting.

In an embodiment, the Custom credentialing component 304 generates a credential on-premises to connect the hosts in the on-premises location with the hosts in the infrastructure provider or in some example embodiments to connect applications in the on-premises location with applications in the infrastructure provider. A credential is an authentication protocol and for example may contain a user name, password, host name, port, a private access key and a URL. In some embodiments, the distributed cloud provider has no access to the credentials which are generated, stored and processed on-premises.

In another embodiment, the properties of overflow infrastructure providers are stored or sensed by the Overflow Scaler module 300. These properties for example may include location, vendor type, capacity and performance metrics such as input/output operations per second (IOPS), and filesystem performance. In an example embodiment, the Overflow Scaler component selects an overflow infrastructure provider based on the computation of predetermined rules on the sensed properties of the infrastructure providers. As an example, the overflow infrastructure provider may be selected due to its geographical location near the on-premises cloud so as to reduce network latency.

In another embodiment, the Secure connection component 306 has no internet connectivity (internet isolated) except to connect the on-premises location and the overflow infrastructure provider. For example, the secure connection may be a transport layer security connection with a security group configured for only allowing the on-premises location access to the overflow location.

In various embodiments, one or more security groups secure the cloud environment by controlling how traffic will be allowed to the hosts. For example, the security groups may ensure that the network traffic has the correct credentials and is only through established ports and protocols.

Figure 4:
FIG. 4 depicts a flow chart of an operation of the Overflow Scaler module 200 in accordance with an illustrative embodiment.

With reference to FIG. 4, this figure depicts a flow chart of an operation of the Overflow Scaler module 200 in accordance with an illustrative embodiment. In the illustrated embodiment, the Overflow Scaler module 400 is an example of the Overflow Scaler module 200 of FIG. 2 and Overflow Scaler module 300 of FIG. 3.

In the illustrated embodiment, the Overflow Scaler module 400 senses the properties of the on-premises cloud 402 and computes whether to scale up or scale down. If the decision is to scale up 404, custom credentials of the selected infrastructure provider are generated 406. A secure environment is created in the selected infrastructure provider 408. A secure connection is established between the on-premises cloud and overflow infrastructure provider. Overflow Scaler module 400 provisions compute nodes, and workload is executed in the selected infrastructure provider 410.

Figure 5:
FIG. 5 depicts a flow chart of an operation of the Overflow Scaler module in accordance with an illustrative embodiment.

With reference to FIG. 5, this figure depicts a flow chart of an operation of the Overflow Scaler module 200 in accordance with an illustrative embodiment. In the illustrated embodiment, the Overflow Scaler module 500 is an example of the Overflow Scaler module 200 of FIGS. 1-2, Overflow Scaler module 300 of FIG. 3 and Overflow Scaler module 400 of FIG. 4.

In the illustrated embodiment, the Overflow Scaler module 500 senses the performance metrics of the on-premises cloud 502. In some embodiments, the Overflow Scaler module 500 further senses the performance metrics of the overflow infrastructure provider. Based on the sensed inputs, the Overflow Scaler module 500 computes whether to scale up or scale down. If the decision is to scale down 504, the overflow infrastructure provider compute hosts are deprovisioned wherein for example any running workload on the overflow infrastructure provider compute hosts is terminated 506, data is transferred to the on-premises hosts, and the workload deployed on the on-premises hosts 508. The Overflow Scaler module 500 exits the environment on the overflow infrastructure provider 510.

It should be understood that although not shown in FIG. 4-5, the Overflow Scaler module may scale up to or scale down from more than one infrastructure provider at a time or take no action based on computing predetermined rules on the sensed performance metrics. As an example, the predetermined rules may include thresholds and limits on computer resources. In another example, the Overflow Scaler module may scale up to or scale down from more than one infrastructure provider at a time or take no action based on whether a compute host has the computer resources or capacity to run a workload. In another example, the Overflow Scaler module may scale up to or scale down from more than one infrastructure provider at a time or take no action based on whether the workloads have completed. For further illustration purposes:

Scenario 1:

The Overflow Scaler module 500 senses the performance metrics of processor usage, memory usage, or storage usage of the on-premises cloud compute hosts, computes predetermined rules on the sensed performance metrics, and decides whether to scale up or take no action.

Scenario 2:

The Overflow Scaler module 500 senses the performance metrics of processor usage, memory usage, or storage usage of the compute hosts on an overflow infrastructure provider, computes predetermined rules on the sensed performance metrics, and decides whether to scale up or take no action.

Scenario 3:

The Overflow Scaler module 500 senses the performance metrics of processor usage, memory usage, or storage usage of the compute hosts on an overflow infrastructure provider, computes predetermined rules on the sensed performance metrics, and decides whether to scale down or take no action.

Figure 6:
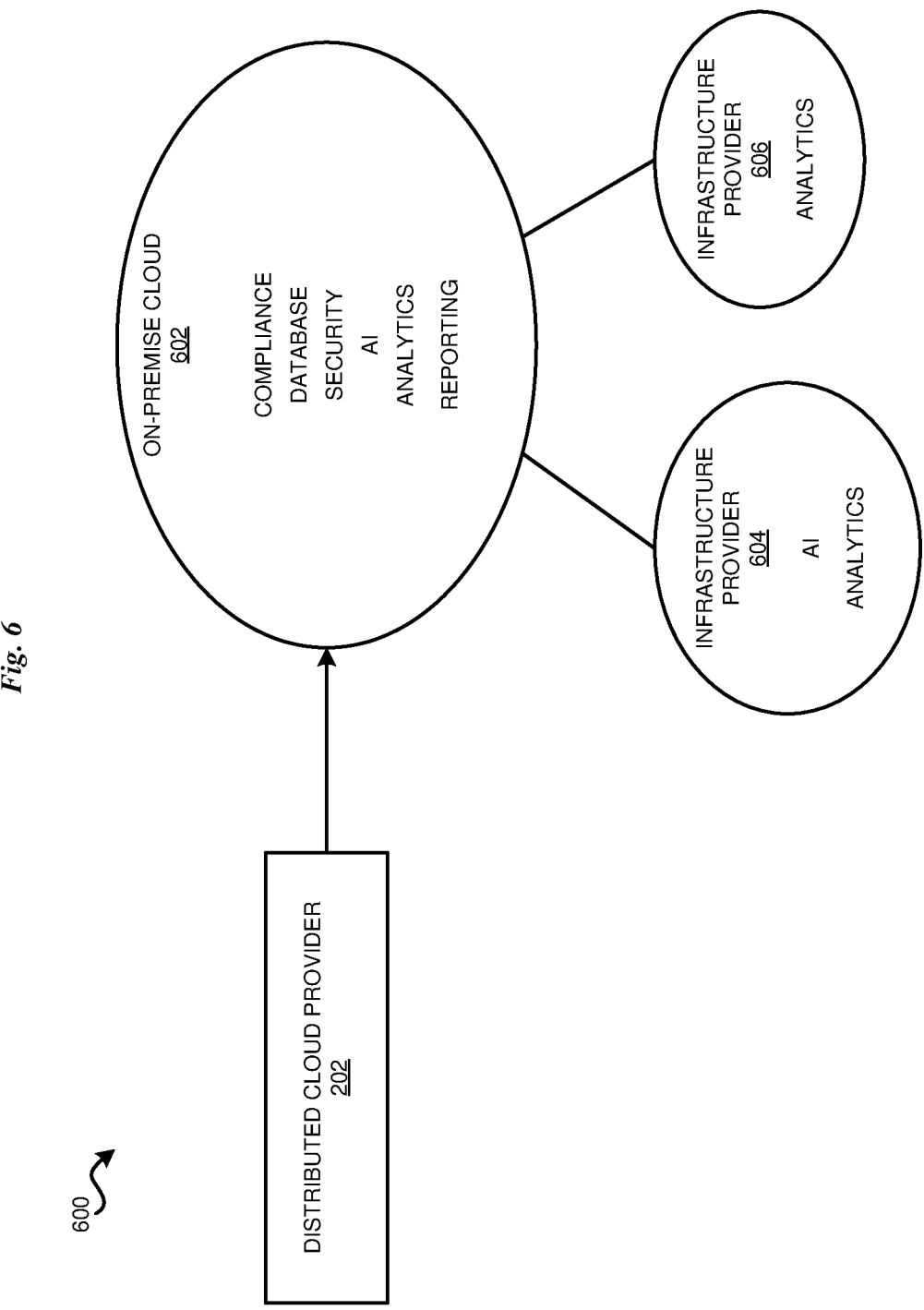
FIG. 6 depicts a diagram of an example of a cloud computing environment in accordance with an illustrative embodiment.

With reference to FIG. 6, this figure depicts a diagram of an example of a cloud computing environment 600 in accordance with embodiments described herein. In the illustrated embodiment, the on-premises cloud 602 comprises the Overflow Scaler module 500 of FIG. 5.

In the illustrated embodiment, the distributed cloud provider 202 provides services to on-premises cloud 602. The compute hosts on the on-premises cloud 602 are running compliance, database, security, artificial intelligence, analytics and reporting workloads. A plurality of overflow infrastructure providers 604 and 606 run AI and analytics workloads.

The process software on-premises Overflow Scaler module may be deployed, accessed and executed through the use of a virtual private network (VPN), which is any combination of technologies that can be used to secure a connection through an otherwise unsecured or untrusted network. The use of VPNs improves security and reduces operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e., the software resides elsewhere), wherein the lifetime of the VPN is limited to a given period of time or a given number of deployments based on an amount paid.

The process software may be deployed, accessed, and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed and executed through the use of dedicated equipment and large-scale encryption used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Figure 7A:
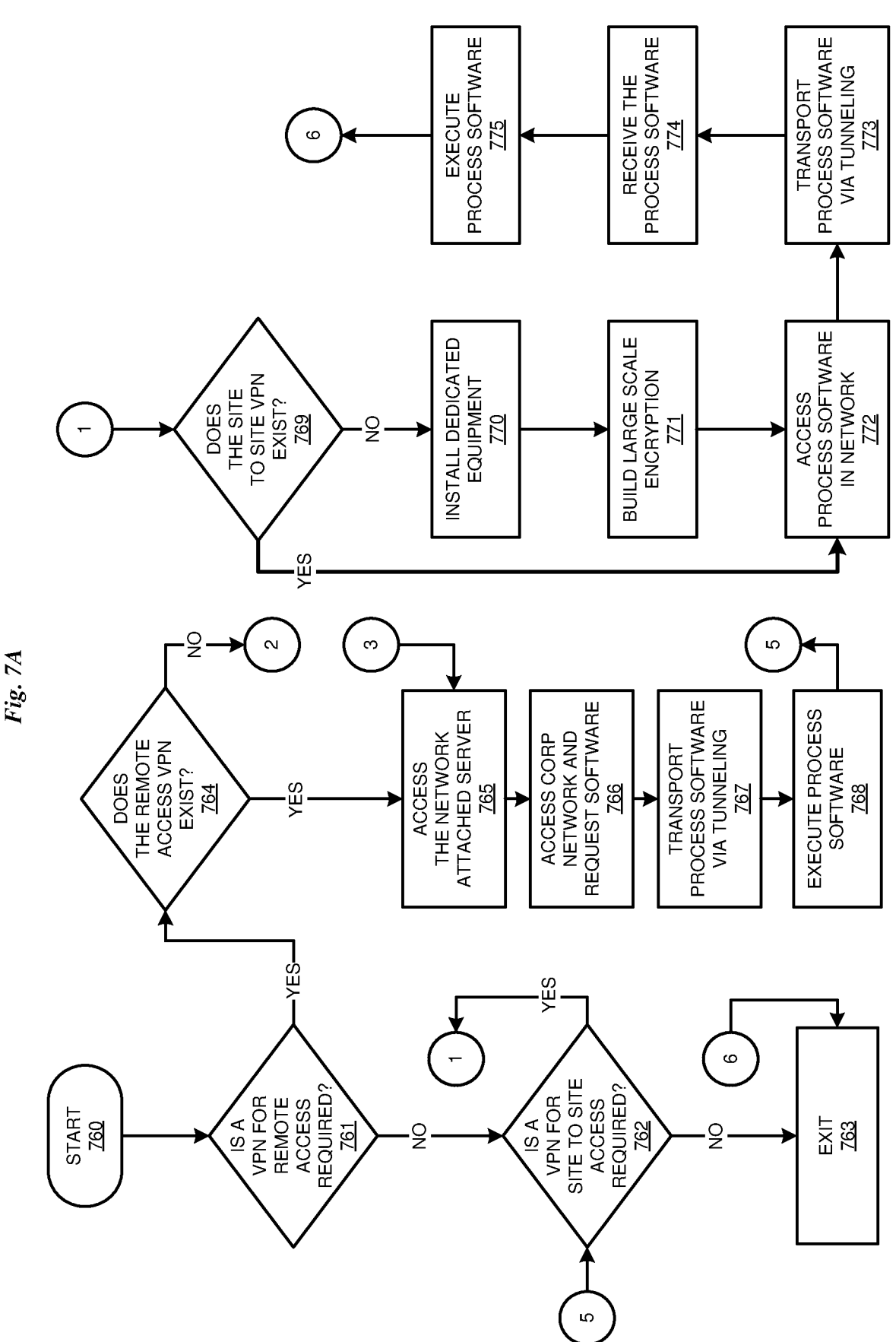
FIG. 7A depicts a flowchart diagram of an example Virtual Private Network (VPN) process in accordance with an illustrative embodiment.
Figure 7B:
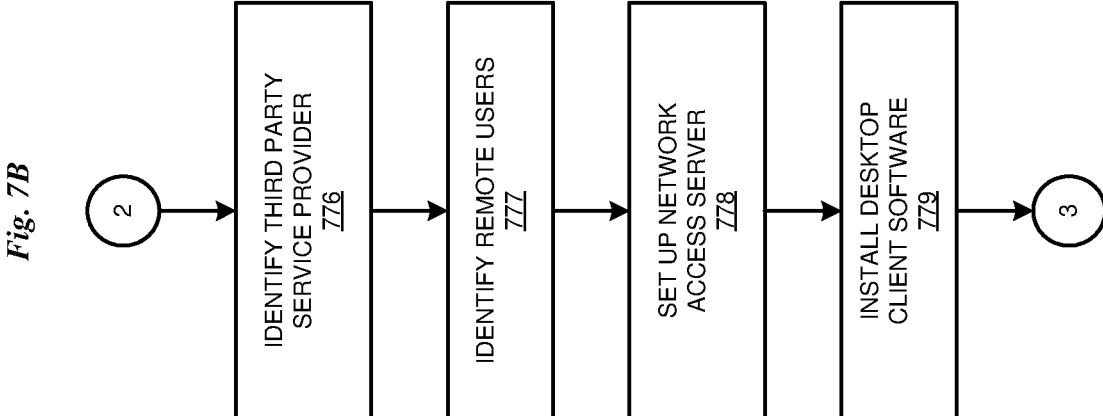
FIG. 7B depicts a flowchart diagram of an example Virtual Private Network (VPN) process in accordance with an illustrative embodiment.

With reference to FIGS. 7A and 7B, depicts a flowchart diagram of an example Virtual Private Network (VPN) process in accordance with an illustrative embodiment.

Step 760 begins the Virtual Private Network (VPN) process. A determination is made to see if a VPN for remote access is required (761). If it is not required, then VPN process proceeds to 762. If it is required, then VPN process determines if the remote access VPN exists (264).

If it does exist, then VPN process proceed to 765. Otherwise, VPN process identifies the third party provider that will provide the secure, encrypted connections between the company's private network and the company's remote users (776). The company's remote users are identified (777). The third party provider then sets up a network access server (NAS) (778) that allows the remote users to dial a toll free number or attach directly via a cable or DSL modem to access, download, and install the desktop client software for the remote-access VPN (779).

After the remote access VPN has been built or if it been previously installed, the remote users can then access the process software by dialing into the NAS or attaching directly via a cable or DSL modem into the NAS (765). This allows entry into the corporate network where the process software is accessed (766). The process software is transported to the remote user's desktop over the network via tunneling. That is, the process software is divided into packets and each packet (including the data and protocol) is placed within another packet (767). When the process software arrives at the remote user's desktop, it is removed from the packets, reconstituted, and then executed on the remote user's desktop (768).

A determination is made to see if a VPN for site to site access is required (762). If it is not required, then VPN process proceeds to exit (763). Otherwise, VPN process determines if the site to site VPN exists (769). If it does exist, then VPN process proceeds to (772). Otherwise, VPN process installs the dedicated equipment required to establish a site to site VPN (770). Then VPN process builds the large scale encryption into the VPN (771).

After the site to site VPN has been built or if it had been previously established, the users access the process software via the VPN (772). The process software is transported to the site users over the network via tunneling. That is, the process software is divided into packets and each packet (including the data and protocol) is placed within another packet (774). When the process software arrives at the remote user's desktop, it is removed from the packets, reconstituted, and executed on the site user's desktop (775). VPN process proceeds to 763 and exits.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

sensing a performance metric of an on-premises cloud, deciding, responsive to sensing the performance metric of the on-premises cloud, to scale up, the deciding further comprising:

sensing a property of an infrastructure provider, responsive to the sensed property, dynamically selecting the infrastructure provider;

dynamically generating a credential in the on-premises cloud for the selected infrastructure provider;

dynamically creating a secure environment in the infrastructure provider using the credential;

dynamically establishing a secure connection between the on-premises cloud and the selected infrastructure provider;

dynamically provisioning a compute host in the selected infrastructure provider, the provisioning causing a secure extension of the on-premises cloud into the selected infrastructure provider, the secure extension appearing as a part of the on-premises cloud to a workload executing in the on-premises cloud; and responsive to determining a need to execute a new workload on the on-premises cloud, scaling up the selected infrastructure provider, moving a portion of the workload to the selected infrastructure provider and executing the portion of the workload on the selected infrastructure provider wherein the portion of the workload moved to the selected infrastructure provider is based on the performance metric of the on-premises cloud accommodating the new workload and wherein the workload is stretched between the on-premises cloud and the selected infrastructure provider.

2. The computer-implemented method of claim 1, wherein the property of the infrastructure provider comprises location, cost, performance metrics or vendor.

3. The computer-implemented method of claim 1, wherein the secure connection is isolated except to connect only the on-premises cloud and the selected infrastructure provider.

4. The computer-implemented method of claim 1, wherein the secure environment in the infrastructure provider further comprises establishing a virtual private cloud.

5. The computer-implemented method of claim 1, wherein the sensed performance metric of the on-premises cloud comprises processor usage, memory usage, or storage usage of the compute hosts.

6. The computer-implemented method of claim 1, further comprising sensing a performance metric of the selected infrastructure provider, deciding, responsive to sensing the performance metric of the selected infrastructure provider to scale down wherein deciding to scale down is based on at least completion of the portion of workload running on a compute host in the selected infrastructure provider, the performance metric of the on-premises cloud and the performance metric of the selected infrastructure provider.

7. The computer-implemented method of claim 1, wherein deciding to scale down comprises:

transmitting host data from the selected infrastructure provider to the on-premises cloud over the secure connection;

deprovisioning a compute host; and terminating the secure connection.

8. A computer program product comprising one or more computer readable storage media, and program instructions collectively stored on the one or more computer readable storage media, the program instructions executable by a processor to cause the processor to perform operations comprising:

sensing a performance metric of an on-premises cloud, deciding, responsive to sensing the performance metric of the on-premises cloud, to scale up, the deciding further comprising:

sensing a property of an infrastructure provider, responsive to the sensed property, dynamically selecting the infrastructure provider;

dynamically generating a credential in the on-premises cloud for the selected infrastructure provider;

dynamically creating a secure environment in the infrastructure provider using the credential;

dynamically establishing a secure connection between the on-premises cloud and the selected infrastructure provider;

dynamically provisioning a compute host in the selected infrastructure provider, the provisioning causing a secure extension of the on-premises cloud into the selected infrastructure provider, the secure extension appearing as a part of the on-premises cloud to a workload executing in the on-premises cloud; and responsive to determining a need to execute a new workload on the on-premises cloud, scaling up the selected infrastructure provider, moving a portion of the workload to the selected infrastructure provider and executing the portion of the workload on the selected infrastructure provider wherein the portion of the workload moved to the selected infrastructure provider is based on the performance metric of the on-premises cloud accommodating the new workload and wherein the workload is stretched between the on-premises cloud and the selected infrastructure provider.

9. The computer program product of claim 8, wherein the property of the infrastructure provider comprises location, performance metrics or vendor.

10. The computer program product of claim 8, wherein the secure connection is isolated to connect only the on-premises cloud and the selected infrastructure provider.

11. The computer program product of claim 8, wherein the secure environment in the infrastructure provider further comprises establishing a virtual private cloud.

12. The computer program product of claim 8, wherein the sensed performance metric of the on-premises cloud comprises processor usage, memory usage, or storage usage of the compute host.

13. The computer program product of claim 8, further comprising sensing a performance metric of the selected infrastructure provider, deciding, responsive to sensing the performance metric of the selected infrastructure provider to scale down wherein deciding to scale down is based on at least completion of the portion of workload running on a compute host in the selected infrastructure provider, the performance metric of the on-premises cloud and the performance metric of the selected infrastructure provider.

14. The computer program product of claim 8, wherein deciding to scale down comprises:

transmitting host data from the selected infrastructure provider to the on-premises cloud over the secure connection;

deprovisioning the compute hosts; and terminating the secure connection.

15. A computer system comprising a processor and one or more computer readable storage media, and program instructions collectively stored on the one or more computer readable storage media, the program instructions executable by the processor to cause the processor to perform operations comprising:

sensing a performance metric of an on-premises cloud, deciding, responsive to sensing the performance metric of the on-premises cloud, to scale up, the deciding further comprising:

sensing a property of an infrastructure provider, responsive to the sensed property, dynamically selecting the infrastructure provider;

dynamically generating a credential in the on-premises cloud for the selected infrastructure provider;

dynamically creating a secure environment in the infrastructure provider using the credential;

dynamically establishing a secure connection between the on-premises cloud and the selected infrastructure provider;

dynamically provisioning a compute host in the selected infrastructure provider, the provisioning causing a secure extension of the on-premises cloud into the selected infrastructure provider, the secure extension appearing as a part of the on-premises cloud to a workload executing in the on-premises cloud; and responsive to determining a need to execute a new workload on the on-premises cloud, scaling up the selected infrastructure provider, moving a portion of the workload to the selected infrastructure provider and executing the portion of the workload on the selected infrastructure provider wherein the portion of the workload moved to the selected infrastructure provider is based on the performance metric of the on-premises cloud accommodating the new workload and wherein the workload is stretched between the on-premises cloud and the selected infrastructure provider.

16. The computer system of claim 15, further comprising sensing a performance metric of the selected infrastructure provider, deciding, responsive to sensing the performance metric of the selected infrastructure provider to scale down wherein deciding to scale down is based on at least completion of the portion of workload running on a compute host in the selected infrastructure provider, the performance metric of the on-premises cloud and the performance metric of the selected infrastructure provider.

17. The computer system of claim 15, wherein deciding to scale down comprises:

transmitting host data from the selected infrastructure provider to the on-premises cloud over the secure connection;

deprovisioning the compute host; and exiting the secure connection.

18. The computer system of claim 15, wherein the secure connection is isolated to connect only the on-premises cloud and the selected infrastructure provider.

19. The computer system of claim 15, wherein the secure environment in the infrastructure provider comprises establishing a virtual private cloud.

20. The computer system of claim 15, wherein the sensed performance metric of the on-premises cloud comprises processor usage, memory usage, or storage usage of the compute host.

* * * * *